US008275949B2

(12) United States Patent
Rieke et al.

(10) Patent No.: US 8,275,949 B2
(45) Date of Patent: Sep. 25, 2012

(54) SYSTEM SUPPORT STORAGE AND COMPUTER SYSTEM

(75) Inventors: Reiner Rieke, Althengstett (DE); Dieter Staiger, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 11/535,080

(22) Filed: Sep. 26, 2006

(65) Prior Publication Data
US 2007/0136508 A1 Jun. 14, 2007

(51) Int. Cl.
*G06F 12/06* (2006.01)
*G06F 13/26* (2006.01)

(52) U.S. Cl. .................. 711/149; 711/151; 711/E12.019

(58) Field of Classification Search .................. 711/149, 711/147, 151, E12.019
See application file for complete search history.

(56) References Cited

U.S. PATENT DOCUMENTS

| | | | |
|---|---|---|---|
| 5,895,493 A * | 4/1999 | Gatica | 711/147 |
| 6,161,162 A * | 12/2000 | DeRoo et al. | 710/244 |
| 6,336,161 B1 * | 1/2002 | Watts | 711/103 |
| 6,401,176 B1 * | 6/2002 | Fadavi-Ardekani et al. | 711/151 |
| 6,826,604 B2 * | 11/2004 | Yamaguchi et al. | 709/220 |
| 6,917,929 B2 * | 7/2005 | Teloh et al. | 707/1 |
| 7,222,172 B2 * | 5/2007 | Arakawa et al. | 709/224 |
| 2002/0092008 A1 * | 7/2002 | Kehne et al. | 717/168 |
| 2003/0002377 A1 * | 1/2003 | Sumitani et al. | 365/230.03 |
| 2003/0009612 A1 * | 1/2003 | Latta | 710/240 |
| 2003/0056062 A1 * | 3/2003 | Prabhu | 711/143 |
| 2003/0112758 A1 * | 6/2003 | Pang et al. | 370/235 |
| 2003/0152087 A1 * | 8/2003 | Shahoumian et al. | 370/401 |
| 2003/0217236 A1 * | 11/2003 | Rowlands | 711/145 |
| 2004/0049650 A1 * | 3/2004 | Ling et al. | 711/173 |
| 2004/0093438 A1 * | 5/2004 | Odom | 710/22 |
| 2004/0123027 A1 * | 6/2004 | Workman et al. | 711/112 |
| 2004/0128432 A1 * | 7/2004 | Nakajima | 711/103 |
| 2004/0133771 A1 * | 7/2004 | King et al. | 713/100 |
| 2004/0177225 A1 * | 9/2004 | Furtek et al. | 711/149 |
| 2004/0243777 A1 * | 12/2004 | Suzuki et al. | 711/162 |
| 2005/0195635 A1 * | 9/2005 | Conley et al. | 365/149 |
| 2005/0223373 A1 * | 10/2005 | Gage et al. | 717/168 |
| 2005/0251617 A1 * | 11/2005 | Sinclair et al. | 711/103 |
| 2005/0273589 A1 * | 12/2005 | Gong | 713/2 |
| 2006/0020765 A1 * | 1/2006 | Mahrla et al. | 711/170 |
| 2006/0020769 A1 * | 1/2006 | Herrell et al. | 712/13 |
| 2006/0069870 A1 * | 3/2006 | Nicholson et al. | 711/118 |
| 2006/0095709 A1 * | 5/2006 | Achiwa | 711/173 |
| 2006/0136765 A1 * | 6/2006 | Poisner et al. | 713/323 |
| 2006/0143411 A1 * | 6/2006 | O'Connor | 711/153 |
| 2006/0253645 A1 * | 11/2006 | Lasser | 711/103 |
| 2007/0028015 A1 * | 2/2007 | Wickham et al. | 710/52 |
| 2007/0033348 A1 * | 2/2007 | Oh | 711/149 |
| 2007/0067514 A1 * | 3/2007 | Anderson et al. | 710/70 |
| 2007/0124544 A1 * | 5/2007 | Dressier et al. | 711/149 |
| 2007/0245038 A1 * | 10/2007 | Lu | 710/8 |

OTHER PUBLICATIONS

"Samsung Electronics Develops Solid State Disk Using NAND Flash Technology," available from http://findarticles.com/p/articles/mi_m0EIN/is_2005_May_23/ai_n13773016/, accessed Jul. 6, 2009.*

* cited by examiner

*Primary Examiner* — Hal Schnee
(74) *Attorney, Agent, or Firm* — Cantor Colburn LLP; John Campbell

(57) ABSTRACT

A Common System Storage Repository replaces all the different system support storages distributed across a server system topology transparent to various subsystems by providing a central non-volatile repository for all the different system data. Each of the various subsystems communicate with the Common System Storage Repository via the individual system support storage interfaces.

17 Claims, 7 Drawing Sheets

| Component | Power Rail /V | Current consumption active mode /A | Current consumption standby mode /A | Percent active | Total power /W |
|---|---|---|---|---|---|
| FPGA | 3,3 | 0,2 | 0,1 | 90% | 0,627 |
| Nand Flash | 3,3 | 0,03 | | 100% | 0,099 |
| Nand Flash Controller | 3,3 | 0,08 | 0,01 | 100% | 0,264 |
| SDRAM | 3,3 | 0,1 | 0,025 | 6% | 0,0975 |
| Oszillator | 3,3 | 0,01 | 0 | 100% | 0,033 |
| Others | 3,3 | 0,01 | 0 | 100% | 0,033 |
| | | | | Power Total /W | 1,1535 |

FIG. 7a

|  | example: Total backup for 32 MB | example: delta backup of 1 MB (only modified areas) |
|---|---|---|
| NAND Flash Sustained Write Speed | 4 MB/s | 4 MB/s |
| Data to save | 32 MB | 1 MB |
| Time required | 8 s | 0,25 s |
| SDRAM Transfer Speed | 66 MB/s | 66 MB/s |
| SDRAM percent active during backup | 6% | 6% |
| Required Energy for Backup | 9,228 J | 0,288375 J |
| Efficiency of the controller for the generation of the backup voltage | 90% | 90% |
| Energy of the Super Cap | 10,25 J | 0,32 J |
| Average Voltage | 0,69 A | 0,69 A |
| Nominal voltage of the Super Cap | 2,5 V | 2,5 V |
| Minimal voltage | 1,2 V | 1,2 V |
| Hub | 1,3 V | 1,3 V |
| required capacity $C = 2 \cdot Vw \cdot t / (Vw^2 - Vmin^2) =$ | 5,76 F | 0,18 F |

FIG. 7b

SYSTEM SUPPORT STORAGE AND COMPUTER SYSTEM

BACKGROUND OF THE INVENTION

The present invention relates to system support storage and a computer system.

High performance server systems are typically architected utilizing at least one 64-bit Central Processing Unit (CPU). Multiple of these CPUs can cooperate in a single server system using Symmetric Multi-Processing (SMP) architectures. Well known representatives of such CPUs are the IBM PowerPC® processor family and the server processors compliant with the so-called x86-64 architecture offered by Intel® and AMD®.

In a server system the CPUs are complemented by a variety of special subsystems implementing special product functionality. The CPUs and these subsystems build up the system topology of a server system. FIG. 1 illustrates a system topology for a server system. A subsystem can itself comprise one or more processors. For example, the subsystems can comprise graphic controllers, user interfaces (keyboard, mouse, etc.), system memories (DDR2 SDRAM, etc.), mass storage controllers (Fibre Channel, SCSI, etc.) and associated mass storage devices (hard disk drives, CD-ROMs, etc.), expansion card/board support systems (Infiniband®, PCI Express, PCI-X, etc.), network adapters (Ethernet, WiFi, etc.), controllers for the attachment of low-speed peripheral devices (USB, FireWire, etc.), digital and analog inputs/outputs (DIO, I2C, etc.), etc.

Especially, for their operation in a server system the system CPUs need special additional components (the processing support "chipset"; e.g. Northbridge, Southbridge, SuperIO etc.). The integrated structure of these special additional components is also called the "processor nest", and can be considered as a special subsystem of the server system. The subsystems of a server system are most commonly implemented by using dedicated controllers. The CPUs as well as the subsystems typically require excessive power-up routines and initialization procedures before the server system is able to load an Operating System (OS)—finally leading to a server system in operational fashion that can launch and execute various applications.

As a very first action to bring the server system alive, the planar board comprising the processor nest and potential subsystem areas (e.g., add-on cards) will be powered up. This process already may require services following a timely defined sequence of bringing up the respective component voltages to exactly defined specification. In the second step when the power-up was successful, the key server system components need to be reset and initialized. The initialization is covering topics like configuring inputs/outputs, allocation of subsystems, setting and calibrating important bus timings, etc.

When the server system is configured and initialized with the basic setup configuration, the server system may require further support for the OS-boot operation, e.g. setting up pre-conditions prior the operating system execution. All the preceding steps are usually called the power-on phase of the server system.

Once the server system reached its normal execution mode, typically further run-time support functions are required to maintain unconstrained server system functionality. These support functions can cover environmental monitoring and control functions such as power and thermal management or functions for the detection of system malfunctions and their recovery. When the server system provides so-called autonomic computing features, also a reconfiguration of the server system may be demanded in parallel to its normal operation.

Typically, the described run-time support functions are serviced by at least one service or sub-system-controller. In a common Blade server system architecture the Base-Board Management Controller (BMC) fulfills this role. The EMC can be represented by one or multiple controllers comprising 8 or 16-bit embedded processors (Hitachi® H8, Intel® 80186, etc.). Other server systems (IBM pSeries, IBM zSeries, etc.) may even require controllers with 32-bit embedded processors (IBM PowerPC® 440, etc.).

The processor nests as well as each of the described service- and subsystem-controllers require dedicated storages providing the data for system reset, configuration, booting and run-time monitoring and support, hereinafter called system data. Especially, the system data can comprise firmware, computer program code that will be executed by processors contained in the subsystems. The system data also comprises so-called Vital Product Data (VPD). Typical VPD information includes a product model number, a unique serial number, product release level, maintenance level, and other information specific to the hardware type. VPD can also include user-defined information, such as the building and department location of the device. The collection and use of vital product data allows the status of a network or computer system to be understood and service provided more quickly.

The specific system support storages are attached to the respective controllers or subsystems and are usually accessible to them only. The main memory of the server is not used as system support storage. The storage requirements are individually defined by the controllers and do have widely varying characteristics and specific attributes:

High or medium or low frequent random read and write access;

Data retention after power off or when an unplanned power-loss occurs (represented by battery backed up memories);

High speed run-time access for read and write (direct controller control memories);

High reliability (guaranteed backup operations and data update operations).

In order to achieve the desired basic server system attributes also a high reliability is required for all its components. Therefore the contribution to the overall material cost of a server system cannot be neglected for these many specialized data repositories. One contributor to this fact is the increased complexity of the system designs; e.g. by adding expansive board wiring to system planar boards that are wiring constrained already.

A battery backed up implementation for Non-Volatile RAM (NVRAM; RAM: Random Access Memory) is expensive and requires a dedicated long term maintenance concept. Typically, such NVRAM devices are broken after 5 to 6 years of operation and need a compatible replacement that is unlikely to be found on the market then. And the permanent discharge of the battery requires a frequent operation of the server system in order to ensure that stored data are not lost. A Read-Only Memory (ROM) device on the other hand stores the data permanently, but the data can be read only and not be updated.

Flash memory stores information on a silicon chip in a way that does not need power to maintain the information in the chip. In addition, flash memory offers fast read access times and solid-state shock resistance. Flash memory is available in two forms: NOR and NAND, where the name refers to the type of logic gate used in each storage cell. One limitation of flash memory is that while it can be read or programmed a byte or a word at a time in a random access fashion, it must be erased a "block" at a time. Starting with a freshly erased block, any byte within that block can be programmed. However, once a byte has been programmed, it cannot be changed again until the entire block is erased. In other words, flash memory (specifically NOR flash) offers random-access read and programming operations, but cannot offer random-access rewrite or erase operations.

All flash architectures today suffer from a phenomenon known as "bit-flipping". On some occasions (usually rare, yet more common in NAND than in NOR), a bit is either reversed, or is reported reversed.

A further inherent limitation of flash memories is the finite number of erase-write cycles (due to wear on the insulating oxide layer around the charge storage mechanism used to store data). For example, today's NOR memories have a maximum number of erase-write cycles in the range from 100000 up to 1 million. Today's NAND flash devices are up to 5 times cheaper than NOR flash memories of equal capacity, can be written 5 to 10 times faster and has ten times the endurance. Since the block size of a NAND flash device is usually eight times smaller than that of a NOR flash device, each NOR block will be erased relatively more times over a given period of time than each NAND block. This further extends the gap in favor of NAND.

However, NAND flash memories do have certain disadvantages compared to NOR flash memories. NAND flash memories do not allow random access reads and can be accessed in blocks of 512 Byte (called pages) only. Therefore code that is stored in NAND flash cannot be executed directly (XIP: eXecute In-Place), but needs to be copied to different random access storage (e.g., RAM) before starting the execution. For the purpose of executing a boot code this is usually circumvented by providing a very small XIP device containing an initial boot code that copies the code from the NAND flash device to a random access device and executes the copied code from there. However, this is a time consuming task and adds additional costs to the overall server system costs.

Due to random errors generated by physical effects in the geometry of the NAND gate, NAND flash memory is prone to low reliability. Due to yield and cost considerations, NAND flash devices are shipped with bad blocks randomly scattered throughout the media. Therefore NAND flash devices need to be initially scanned for bad blocks that have to be marked as unusable.

Various design options for the use of NAND flash memory are available. It is feasible to manage NAND flash memory by means of software executed on a processor alone. However, this leads to a very low performance, mostly due to the heavy error detection code required for every read/write to the flash memory. Therefore, NAND devices usually have an integrated controller, although it is also possible to use separate controllers instead, that provide error detection and correction capabilities already. The most advanced controllers provide NOR flash-like interfaces and boot capabilities to the NAND flash devices. An example of such a NAND flash device with an intelligent controller is the M-Systems DiskOnChip device family. However, even these flash devices have a read/write performance penalty.

The disadvantages of the NAND flash memories prevented its use as data storage in server system topologies in the past. This prejudice is likely to be dropped in the near future when NAND flash devices with intelligent controllers are more visible on the market and have clearly demonstrated their reliability.

Many of the used system storage devices have a low performance characteristic. This can cause negative aspects such as long power-up phases and decreased system performance during the normal operation of the server system. However, configuration updates in NVRAM during the power-on phase and firmware code updates in flash devices are rather rare events today. The patent application U.S. 2004/0123033 A1 incorporated herein by reference proposes to add a volatile storage (e.g., a cache) to an associated memory array within a semiconductor non-volatile memory as a way to mitigate the access penalty that occurs in non-volatile memories such as flash memories.

Magnetoresistive RAM (MRAM) is an NVRAM technology, which has been in development since the 1990s. Continued increases in density of existing memory technologies, notably flash memory and DRAM (Dynamic RAM), have kept MRAM out of the market to date, but proponents believe that the advantages are so overwhelming that MRAM will eventually become widespread. More recently many of the companies working on MRAM have scaled back their efforts, as it appears the system has problems scaling down in size.

Ferroelectric RAM (FRAM or FeRAM) does not yet offer the bit density of DRAM and SRAM, but is non-volatile, is faster than flash memory (write times under 100 nanoseconds, roughly as fast as reading), and has very low power requirements.

Due to their different characteristics, also the effort for programming the various storage devices (NAND flash, NOR flash, ROM, NVRAM) is significant during the development, manufacturing, maintenance, and repair phases for a server system. It likely requires a large set of different tools for each of the different storage devices and also requires providing and maintaining the different storage content in a variety of files.

SUMMARY OF THE INVENTION

It is therefore an object of the present invention, to provide a system support storage that is improved over the prior art and a corresponding computer system.

This object is achieved by the invention as defined in the independent claims. Further advantageous embodiments of the present invention are defined in the dependant claims.

The advantages of the present invention are achieved by a new Commmon System Support Repository (CSSR)—a new storage device that is integrated into a server system. In the preferred embodiment of the invention, the CSSR is implemented by using a combination of SDRAM (Synchronous DRAM) and NAND flash memory of equal capacity, where the NAND flash serves as a persistent mirror copy of the SDRAM, both controlled by a new CSSR engine controller hardware. The CSSR engine is preferably implemented in form of an ASIC (Application Specific Circuit).

A more expensive implementation uses battery backed-up NVRAM instead of the combination of SDRAM and NAND flash memory. A further possibility is to use MRAM or FRAM.

The CSSR is used to replace all the different system support storages distributed across a server system topology transparent to the various subsystems. Therefore the CSSR is providing a central repository for all the different system data. The CSSR has all the needed attributes of the typical system support storages such as ROM, NVRAM, and NOR flash memory. In addition, the CSSR has improved performance and data persistence attributes.

The use of the CSSR allows reducing the number of components in a server system, reducing its complexity, and therefore increasing the overall system reliability. Due to the reduced number of components the manufacturing costs and the power consumption of a server system is reduced. Further advantages are the potential space and mass reductions that allow adding new components/functions. These advantages are especially beneficial for cost, power, and space constrained server systems such as Blade server systems.

The performance improvements can lead to an improved overall server system performance, especially during the power-on phase. The CSSR will also provide sufficient space to add additional system data that could not be stored due to cost constraints in today's system support storages. The increased storage capacity of the CSSR allows storing bigger and therefore more intelligent firmware, so new and extended functions and capabilities can be added to the server system. Given the small amount of overall aggregated capacity in the different system support storages, the storage increase can be achieved by using the smallest NAND flash memories available on the market today already.

Since the CSSR is a system support storage replacement that is transparent to the various subsystems, existing firmware that is accessing system support storages does not need to be adapted. Especially, the CSSR allows changing existing server system topologies by integrating a CSSR. It also offers a smooth migration path for new server system topologies derived from existing topologies.

In addition, existing development and manufacturing tools and processes dealing with the programming of the different system support storages do not need to be changed. Further, the CSSR as a common central storage offers a way to reduce the number of these different tools and processes, hence reducing the complexity of the development and manufacturing processes. The resulting cost and time savings are other advantages of the invention. For example, firmware code updates via the CPUs or via network devices are much easier to implement and therefore more reliable.

BRIEF DESCRIPTION OF THE DRAWINGS

The present invention and its advantages are now described in conjunction with the accompanying drawings.

FIGS. 7a, 7b: Are tables providing example data for a super capacitor to be used in accordance to one embodiment of the present invention.

DETAILED DESCRIPTION

Figure 1:
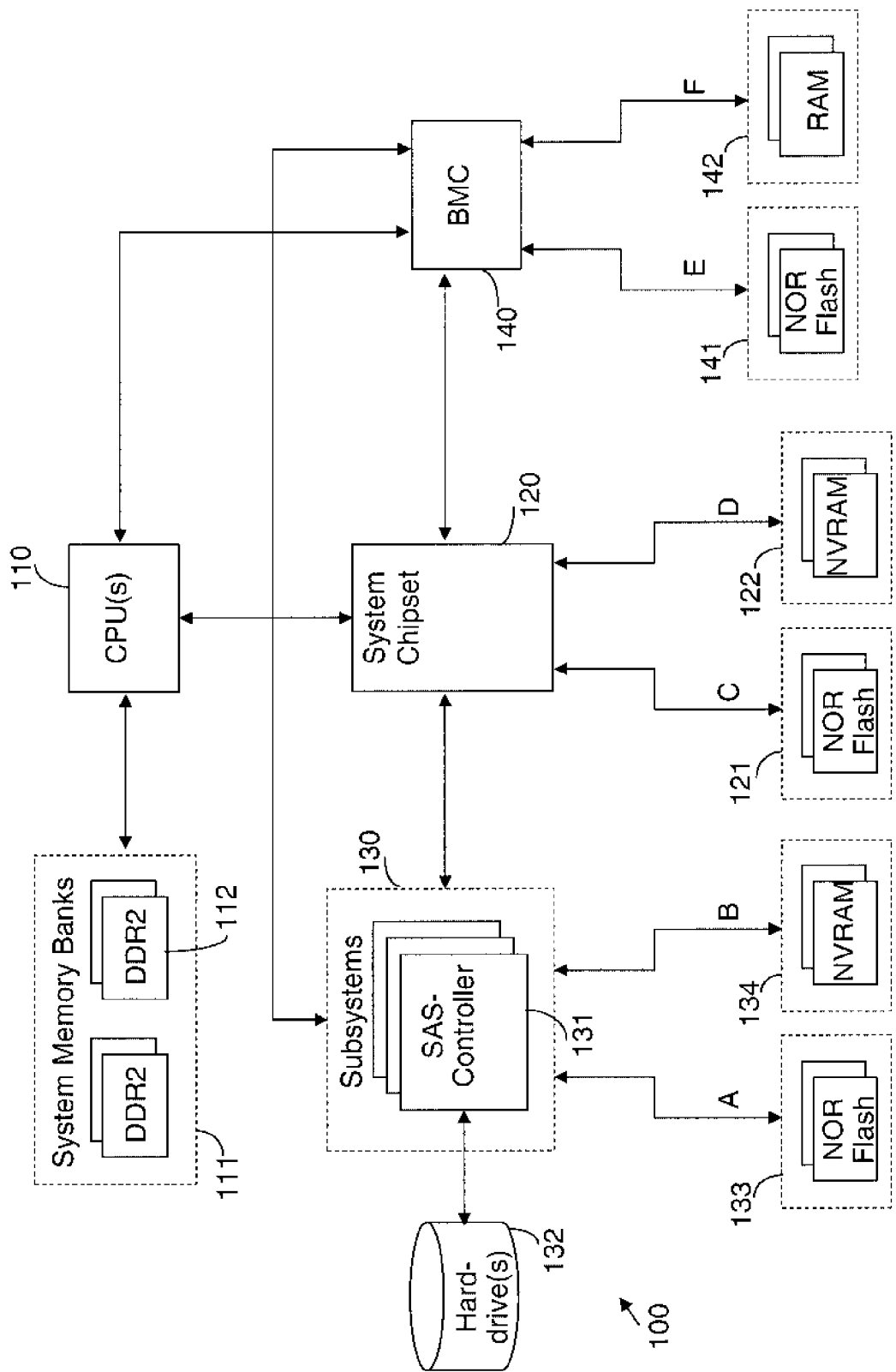
FIG. 1: Is a schematic block diagram of a server system illustrating its system topology of the prior art.

A typical system topology for a server system 100 (e.g. a Blade server system) is illustrated in FIG. 1. At least one CPU 110 has access to the main storage of the server system, here implemented in form of System Memory Banks 111. A system memory bank comprises a number of DDR2 RAM modules 112. The CPU 110 is integrated with the system chipset 120 that has attached a NOR flash device 121 via path C and an NVRAM device 122 via path D. The server system 100 comprises various subsystems 130, especially it comprises a SAS-controller 131 (SAS: Serial Attached SCSI; SCSI: Small Computer System Interface) to which at least one hard disk drive 132 is attached.

The subsystems have attached a NOR flash device 133 via path A and an NVRAM device 134 via path B. A BMC 140 controls the CPU 110, the system chipset 120, and the subsystems 130. The BMC 140 has attached a NOR flash device 141 via path E and a RAM device 142 via path F. A server system 100 also comprises a power supply or even a power subsystem that is not shown here.

Figure 2:
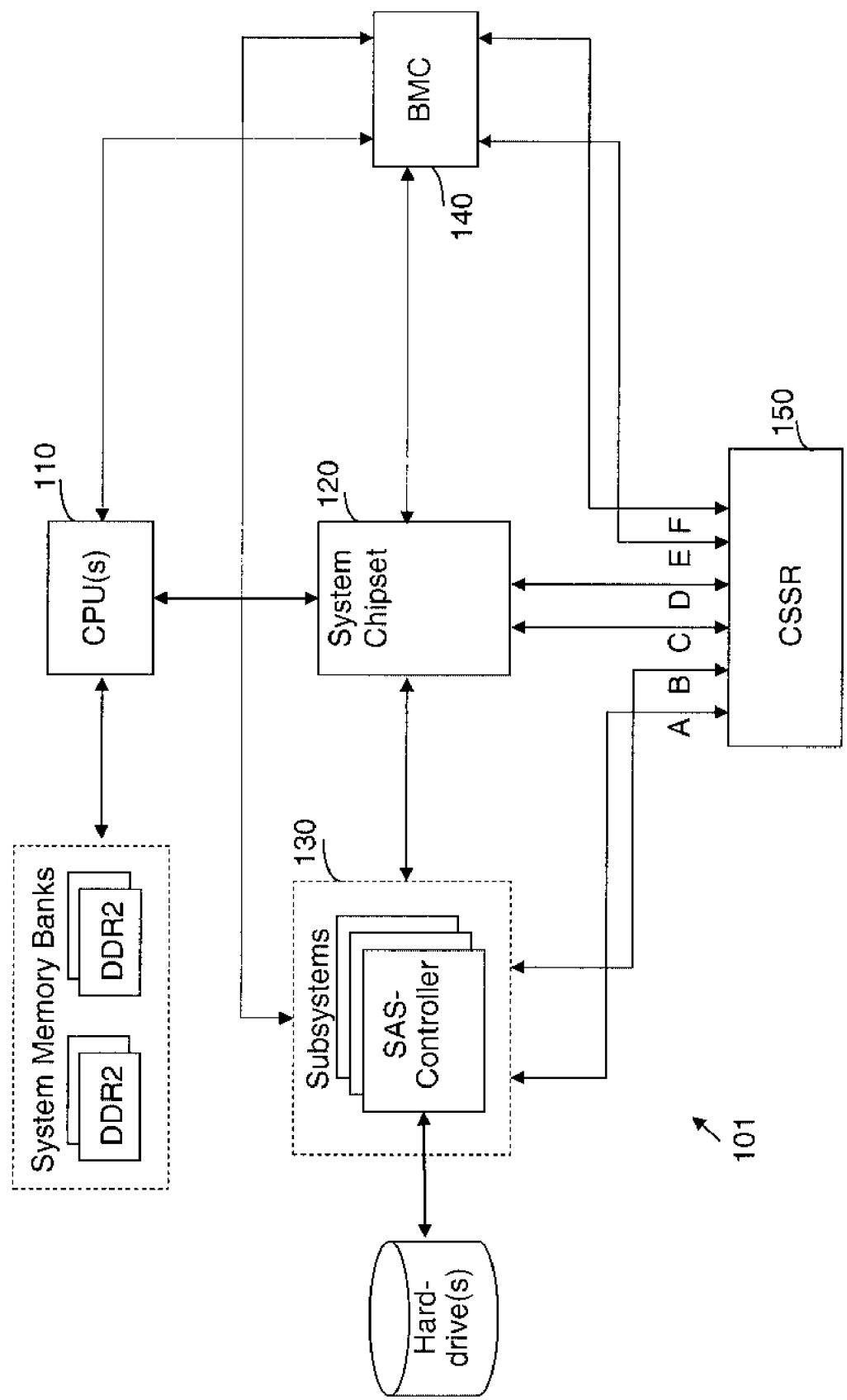
FIG. 2: Is a schematic block diagram of a server system in accordance to the present invention.

FIG. 2 shows the system topology for a server system 101 that results from changes to the system topology of the server system 100 shown in FIG. 1 by applying a system design method in accordance to the present invention. The paths A, B, C, D, E, and F connect the CPU 110, the subsystems 130, the system chipset 120, and the BMC 140 to a Common System Storage Repository (CSSR) 150. Insofar the CSSR 150 replaces the NOR flash devices 133, 121, and 141, the NVRAM devices 134 and 122, and the RAM 142. In concrete hardware implementations of the server system 100 the paths A to F are hardware interfaces like PCI (Peripheral Component Interface) bus connections, Hitachi H8 bus connections, or Low Pin Count (LPC) bus connections.

Figure 3:
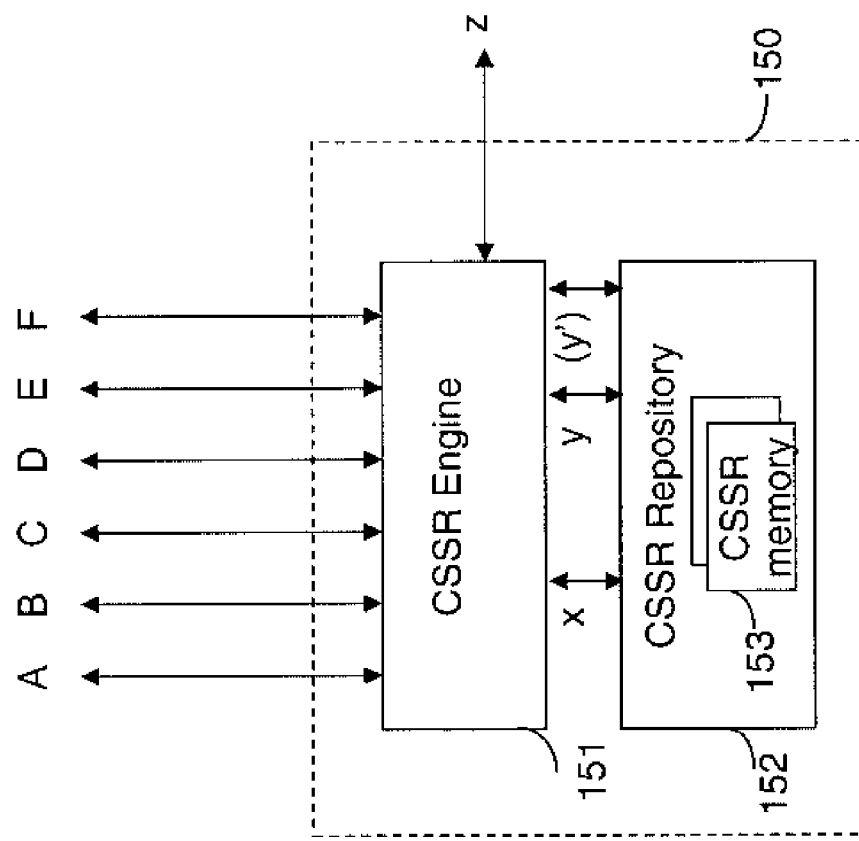
FIG. 3: Is a schematic block diagram of a system support storage device in accordance to the present invention.

The basic internal structure of the CSSR 150 is illustrated in FIG. 3. The CSSR 150 comprises a CSSR engine 151 and a CSSR repository 152. The paths A to F are connected to the CSSR engine 151. The CSSR repository 152 comprises CSSR memory 153. The CSSR engine 151 and the CSSR repository 152 are connected via the paths x and y, and optionally (in one embodiment) via the additional path y'. The CSSR engine 151 is also connected to another path z that allows accessing and updating the entire CSSR memory 153.

Figure 4:
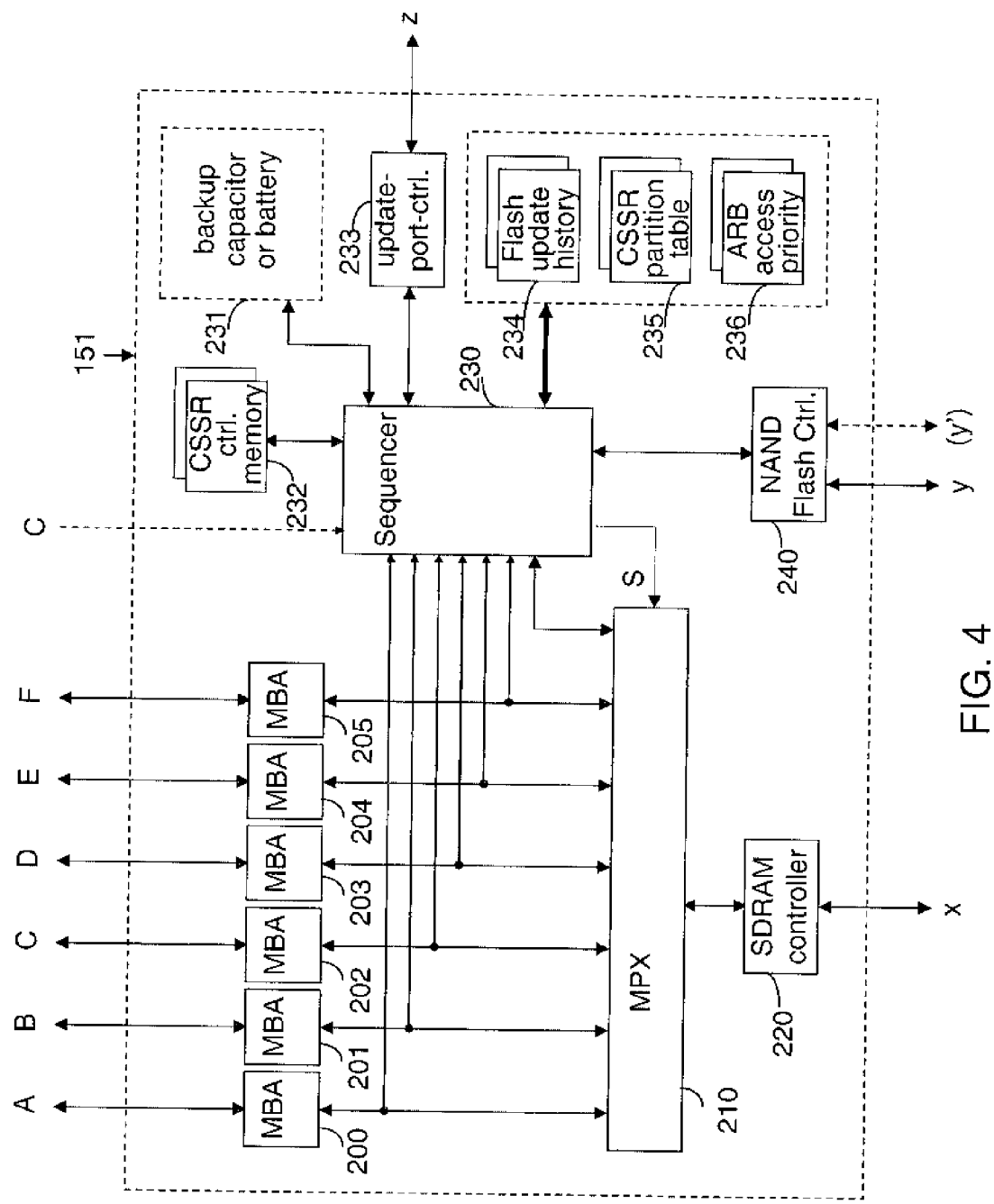
FIG. 4: Is a schematic block diagram of a system support storage device engine in accordance to the present invention.

A more detailed internal structure of the CSSR engine 151 is illustrated in FIG. 4. The paths A to F are connected to a Memory Bus controller/port-Adapter (MBA) each, the MBAs 200, 201, 202, 203, 204, 205. Examples for such MBAs are PCI and LPC bus adapters. The MBAs 200 to 205 are connected to a multiplexer (MPX) 210, which is connected to an SDRAM controller 220. The path x connects the SDRAM controller 220 in the CSSR engine 151 and the CSSR repository 152 shown in FIG. 3. The MBAs 200 to 205 are also connected to a programmable sequencer 230, which controls the multiplexer 210 via the selector path S. In the preferred embodiment the sequencer 230 is implemented in form of an FPGA (Field Programmable Gate Array) comprising a very small RAM (e.g. 1 KByte).

The sequencer 230 is also connected to the CSSR control memory 232 and is used as a small finite state machine. The state of the sequencer 230 can be preserved in the preferred embodiment by an additional backup capacitor 231, e.g. a super capacitor, or a battery 231 in case of unexpected power losses. A typical example of such an unexpected power loss is the physical removal of a Blade server system from its housing rack. In one embodiment of the invention, the sequencer 230 can be controlled via the system condition path C.

The path z is connected to an update port controller 233, which is connected to the sequencer 230. The sequencer 230 further uses some registers to store intermediate data: the flash update history registers 234, the CSSR partition table registers 235, and the arbitration access priority registers 236. The NAND flash controller 240 is connected to the CSSR repository via the path y and optionally via the additional path y'. The sequencer 230 also controls the NAND flash controller 240.

Figure 6:
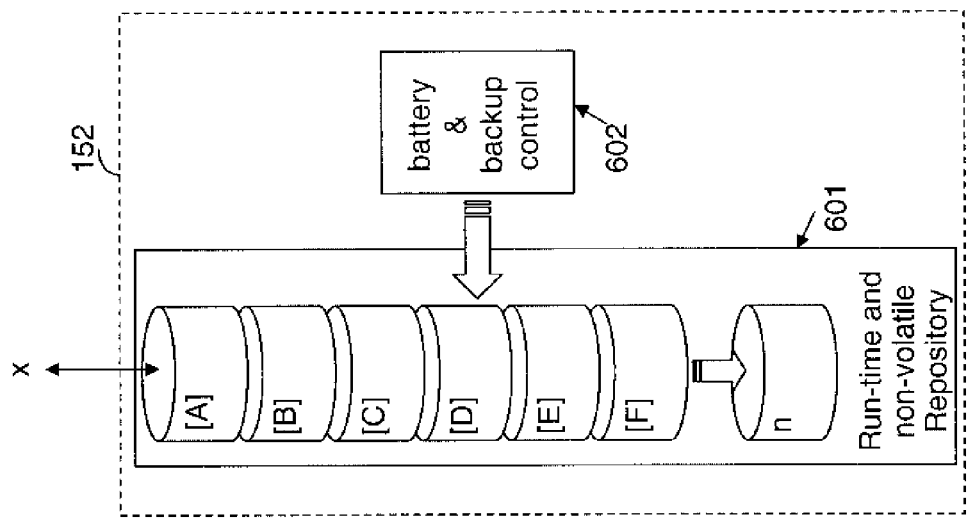
FIG. 6: Is a schematic block diagram of the internal memory layout of a storage device in accordance to the present invention.
Figure 5:
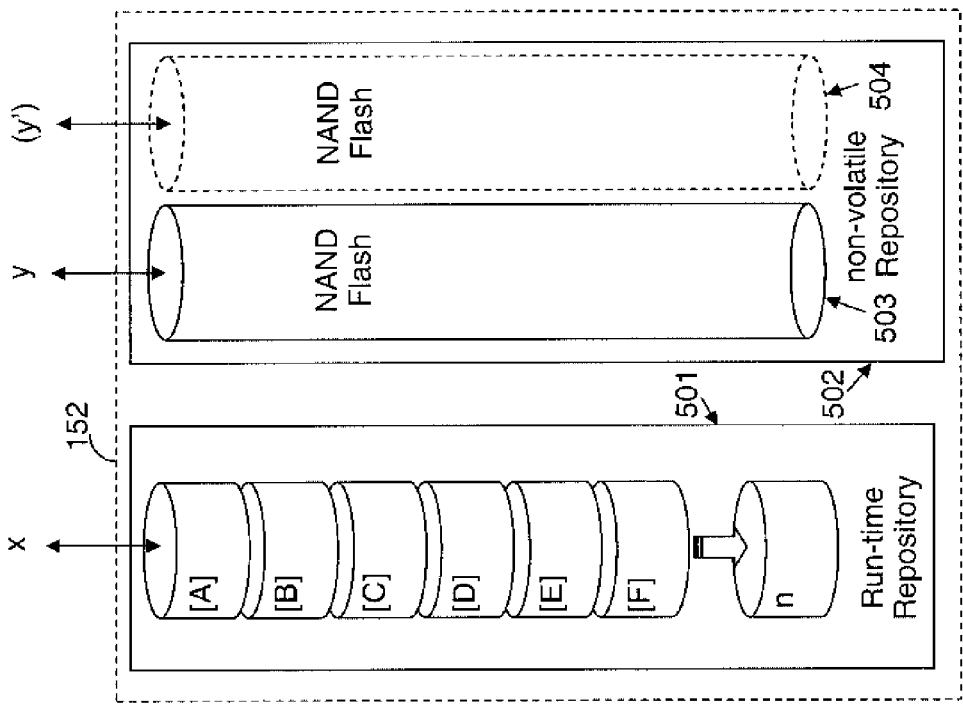
FIG. 5: Is a schematic block diagram of the internal memory layout of a system support storage device in accordance to the present invention.

More detailed internal structures of the CSSR repository 152 are illustrated in FIGS. 5 and 6, which show two different embodiments. The preferred embodiment is shown in FIG. 5, where the CSSR memory 153 comprises a volatile run-time repository 501 and a non-volatile repository 502. The run-time repository 501 is implemented as DRAM, and the non-volatile repository 502 is implemented using NAND flash memory 503. In one embodiment the NAND flash memory 503 is supplemented by a NAND flash memory 504. The CSSR engine 151 accesses the run-time repository 501 via the path x that connects the SDRAM controller 220 to the SDRAM, and the non-volatile repository 502 via the path y that connects the NAND flash controller 240 to the NAND flash memory 503 and optionally via the path y' that connects the NAND flash controller 240 to the NAND flash memory 504.

Another implementation for the CSSR repository 152 is shown in FIG. 6, where a run-time and non-volatile repository 601 is implemented as a DRAM for which a battery and backup control module 602 ensures that the content of the DRAM is not lost during unexpected power losses.

The content stored in the run-time repositories 501 and 601 comprises contiguous memory partitions [A], [B], [C], [D], [E], and [F] that relates to the system data of the server system 100. This system data is stored in the NOR flash device 133, the NVRAM 134, the NOR flash device 121, the NVRAM 122, the NOR flash device 141, and the RAM 142 which are accessed via the paths A to F in the server system 100 shown in FIG. 1.

In addition to the partitions [A] to [F] the run-time repositories 501 and 601 also comprise a contiguous block of free memory n. In the preferred embodiment of the invention the content of the memory partitions [A] to [F] is stored in the non-volatile repository 502. In the embodiment using where a battery and backup control module 602 is used instead of an additional non-volatile repository 502 the partitions and their content are created using dedicated update hardware during the manufacturing or repair of the server system 101 via path z and the update port controller 233.

The memory partitions in the run-time repository 501 are created when the CSSR 150 is initialized. In this step the content of the memory partitions [A] to [F] is copied from the non-volatile repository 502 to the run-time repository 501. The content of the memory partitions [A] to [F] and n can be created in the non-volatile repository 502 by a special flasher device that is used to program the flash memory chips before they are mounted on a planar board that carries the CSSR repository 152. The data used for the programming comprises all the data that would be stored in the NOR flash device 133, the NVRAM 134, the NOR flash device 121, the NVRAM 122, the NOR flash device 141, and the RAM 142 in the server system 100. All this data would also be used for the run-time repository 601 during manufacturing or repair of the server system 101.

The CSSR control memory 232 contains CSSR specific configuration data and program code which are used by the sequencer 230. In the simplest implementation the CSSR control memory 232 is implemented as a ROM. In another embodiment of the invention, the CSSR control memory 232 is implemented as a NOR flash device. This flash device is programmed before it is mounted on a planar board that carries the CSSR repository 152. It is well known by persons skilled in the art that the programming is performed by sending special data to the flash device that is interpreted as commands. The programming of the flash device is the execution of these commands by the flash device. The commands which are supported by the flash device are described in the specification manual supplied by the manufacturer.

When the flash device is already mounted on a planar board, then it can be programmed by the sequencer 232 using the update port controller 233 via path z. The programming can then be performed by external flasher hardware such as a personal computer having the required hardware interfaces to use the path z. In the preferred embodiment of the invention the BMC 140 can be used to program the CSSR control memory 232. Any change to content of the CSSR controller memory 232 can only be performed when the server system is in a halt mode, where the CPU 110 and all the subsystems are stopped, which need system configuration data from the CSSR 150.

The CSSR configuration data is stored at the start of the logical address space. This allows using fixed addresses for accessing certain configuration data and simplifies the storing and loading of this data therefore. The CSSR specific configuration data comprises a partition table that defines the addresses of the beginning and end of the memory partitions [A] to [F] and n.

During the initialization of the CSSR 150, the sequencer 230 is initialized first. The CSSR specific configuration data also comprises the content of the internal RAM of the CSSR sequencer 230; especially it contains the program code to be executed by the sequencer. This content is loaded by the CSSR sequencer 230 to its internal RAM during its initialization. While executing this program code, steps the CSSR partition table is copied by the CSSR sequencer 230 from the CSSR control memory 232 to the CSSR partition table registers 235. In further steps the sequencer 230 is setting up all the hardware of the CSSR 150 by writing specific values in specific hardware registers.

For example, it is well-known for persons skilled in the art that the SDRAM controller 220 and the NAND flash controller 240 need to be configured appropriately. At the end of the initialization of the CSSR 150 the content of the memory partitions [A] to [F] is copied by the sequencer 230 from the non-volatile repository 502 to the run-time repository 501 via the path x using the SDRAM controller 220.

In the preferred embodiment of the invention the CSSR control memory 232 is implemented as a part of the NAND flash memory 503. Then the FPGA used to implement the sequencer 230 also comprises hard-coded program code for the sequencer 230. The remaining program code can then be loaded from the NAND flash memory 503.

In a further embodiment of the invention the BMC 140 is used to initialize the CSSR 150 instead of using the sequencer 230 to perform the initialization steps In this case the BMC 140 requires a dedicated boot flash memory containing code and configuration data for the CSSR 150. This boot code comprises code required for the BMC 140 to perform the initialization of the CSSR 150. The BMC 140 loads the boot code using the update port controller 233 which is directly connected to the CSSR control memory 232.

Whenever the content of a memory partition [A] to [F] is changed during the normal operation of the server system 101 the content of the memory partitions [A] to [F] is written transparently in a background process to the non-volatile repository 502. The change of a partition is marked in the flash update history registers 234. This way it is ensured that any changes to the system support storages are preserved after an expected or unexpected power loss. An expected power loss happens when a power off phase of the server system 101 is triggered. Then the content of the memory partitions [A] to [F] is written to the non-volatile repository 502 before the power off phase is completed.

The successful completion of a write to flash operation can be ensured by the optional backup capacitor or battery 231. The tables in FIGS. 7a and 7b provide an example calculation for the required capacity of a super capacitor to be used for the backup capacitor 231. Only a successful write operation can guarantee valid data in the non-volatile repository 502. By optionally using an additional NAND flash memory 504 that serves as a data mirror of the NAND flash memory 503 the data integrity can be further enhanced. Whenever the NAND flash memory 503 is programmed, then also the same programming is performed by the NAND flash controller 240 via the path y' on the NAND flash memory 504. In case of any read errors for the NAND flash memory 503 the NAND flash controller 240 can use the needed data from the NAND flash memory 504 instead.

A power-off phase of the server system 101 can be signalled to the CSSR 150 using the system condition path C that is connected to the CSSR engine 151. The system condition path C could also be used to trigger a write to flash in the CSSR 150 in case of failures of the power supply or the power subsystem, or when the CPU 110 goes into a power save mode. A power save mode of the CPU 110 can also be used to initiate a copy operation of the content of the NAND flash memory 503 to the NAND flash memory 504.

The MBAs 200 to 205 allow a replacement of the system support storage devices of the server system 100 resulting in the server system 101 that is transparent to the subsystems of the server systems 100 and 101. If the replacement would not be transparent, this would cause other hardware and software/firmware design changes that would increase the overall cost of the server system 101 and could lead to new implementation errors.

In the simplest example, an MBA is a well-known memory interface for SRAM and flash memory. In a more complicated example, the paths C and D are PCI bus connections and the paths E and F are Hitachi H8 bus connections. Then the MBAs 202 and 203 serve as a bridge between the PCI bus and the internal paths from the MBAs 202 and 203 to the multiplexer 210 and the sequencer 230. And the MBAs 204 and 205 serve as a bridge between the Hitachi H8 bus and the internal paths from the MBAs 204 and 205 to the multiplexer 210 and the sequencer 230. In another example, an MBA provides an I2C (Inter-Integrated Circuit) interface.

During the initialization of the CSSR 150, the MBAs 200 to 205 need to be configured such that they are able to access their associated memory partitions [A] to [F] in the CSSR memory 152. In the preferred embodiment of the present invention, the MBAs need to know the address space of their associated memory partitions in the run-time repository 501. During the initialization of the CSSR engine 151, the sequencer 230 is storing the address offset in a register of the MBAs 200 to 205 each that correlates to the address in the SDRAM of the beginning of the associated memory partition [A] to [F]. This address offset is then used as an address prefix by the MBAs 200 to 205 when generating the addresses to be accessed in the SDRAM via the SDRAM controller 220.

In case of parallel accesses to the CSSR 150 via the paths A to F the sequencer 230 arbitrates the accesses to the CSSR memory 153 using the multiplexer 210 and the selector S. In the simplest solution this can be done on a first-come-first-serve scheme. In the preferred embodiment of the invention, the paths A to F are prioritized. For example, depending on the state of the server system 101 the BMC 140 can have a higher priority than the CPU 110, e.g. when the server system 101 is in the initialization or power-on phase. In that case the paths E and F have a higher priority than the paths C and D, and therefore accesses via the paths E and F are served before accesses via the paths C and D are served.

The prioritization of the paths A to F is stored by the sequencer 230 in the arbiter access priority registers 236. For the prioritization the sequencer 230 is processing the ports of the MBAs 200 to 205 in the order of the associated paths A to F. When a request needs on a port is waiting to be processed, it will be processed and completed by the sequencer 230 before the next port is processed.

The performance penalties introduced by the arbitration of parallel accesses to the CSSR memory 153 via the paths A to F are on average more than compensated by the SDRAM used to implement the run-time repositories 501 and 601, because the SDRAM allows much faster accesses as the NOR flash devices 133, 121, and 141.

The entire content of the CSSR memory 153 can be stored, retrieved and updated using dedicated update hardware during the manufacturing or the repair of the server system 101. This allows updating the system data of the server system 101 when the server system 101 is in a halt mode where the CPU 110 and all the subsystems are stopped, which need system configuration data from the CSSR 150. The update hardware uses the update port controller 233 via path z in order to access to the CSSR memory 153 with the help of the sequencer 230. But it is also possible to connect the path z to the BMC 140 such that it can perform an update of the system data in a firmware code update step of the server system 101.

During the development of a server system 100, especially during the firmware development, it is often detected that the system support storages such as the system support storages 133, 134, 121, 122, 141, and 142 have not enough storage capacity as it is tried in the system design to minimize the overall system costs as much as possible. In such a case it is required to use other chips providing higher capacity in order to implement the system support storages. But often such design changes cannot be done transparently for all components of the server system 100, and hence they introduce further design changes and are an inherent source of errors therefore. For the CSSR memory 153 this problem does not exist as the boundaries of the memory partitions are freely moveable when replacing the entire data content of the CSSR 150.

while a particular embodiment has been shown and described, various modifications of the present invention will be apparent to those skilled in the art.

What is claimed is:

1. A system for providing a shared high speed persistent storage, the system comprising:
   a common system storage repository (CSSR), the CSSR comprising:
   a CSSR repository, the CSSR repository comprising:
      a non-volatile persistent storage, the non-volatile persistent storage comprising a plurality of partitions of system data; and
      a volatile run-time repository comprising a volatile storage in communication with the non-volatile persistent storage; and
   a plurality of point-to-point connections, for providing access to respective portions of said volatile run-time repository to subsystems of a computer system;
   wherein the CSSR is configured to perform a method comprising:
   responsive to the CSSR being powered up, copying content of said non-volatile persistent storage into said volatile run-time repository;
   responsive to the CSSR being powered up, assigning unique portions of said volatile run-time repository corresponding to each of the plurality of partitions to each point-to-point connection of the plurality of point-to-point connections;

prioritizing access to each unique portion of said volatile run-time repository;

permitting access to each unique portion of said volatile run-time repository by way of only an assigned one of said point-to-point connections according to the prioritization;

updating at least one of the unique portions of said volatile run-time repository responsive to the permitting;

identifying the at least one unique portion of said volatile run-time repository that has been updated;

writing, via a background process, changes in said volatile run-time repository to said non-volatile persistent storage in response to every update to the contents of said volatile run-time repository; and marking, in a flash update history register, responsive to the updating and identifying, that the at least one of the unique portions of said volatile run-time repository has been updated, the marking causing the change to be preserved after a power loss;

wherein a size of each of the plurality of partitions is configurable by reprogramming the CSSR.

2. The system according to claim 1, further comprising responsive to the CSSR beginning a power-down state, copying content of said volatile run-time repository into said non-volatile persistent storage.

3. The system according to claim 2, wherein the non-volatile persistent storage is NAND Flash memory.

4. The system according to claim 2, further comprising:
a main storage;
a plurality of subsystems, each subsystem of said plurality of subsystems communicatively connected to said CSSR by way of a unique one of said point-to-point connections; and
a Central Processing Unit (CPU), the CPU communicatively connected to the main storage and each of said plurality of subsystems.

5. The system according to claim 1, wherein the CSSR further comprises a z port, the z port providing accessing and updating of all of said unique portions and said non-volatile persistent storage; and
updating said unique portions of said non-volatile memory when said subsystems of said computer system are stopped.

6. The system according to claim 4, wherein said volatile run-time repository comprises a DRAM and said non-volatile persistent storage comprises a NAND flash memory.

7. The system according to claim 1, wherein the unique portions of said volatile run-time repository and non-volatile persistent storage comprise firmware for respective subsystems, the firmware for any one of system reset, configuration, booting and run-time monitoring of the respective subsystem.

8. The system according to claim 4, wherein the CSSR further comprises a sequencer for arbitrating access between each of said point-to-point connections.

9. The system according to claim 8, wherein said arbitrating access is determined on a first-come first-served basis.

10. The system according to claim 8, wherein said arbitrating accesses is determined by a predetermined priority scheme wherein each of said point-to-point connections has a predetermined access priority.

11. The system according to claim 1, wherein the CSSR further comprises a plurality of memory bus adapters (MBAs), each MBA connected to a corresponding unique point-to-point connection, wherein responsive to powering-on, each MBA is assigned addressability to a corresponding unique portion of said volatile run-time repository.

12. A method for providing a shared high speed persistent storage, the method comprising:
responsive to a common subsystem repository (CSSR) being powered up, copying by the CSSR, content of a non-volatile persistent storage of the CSSR into a volatile run-time repository of the CSSR, said volatile run-time repository comprising a volatile storage and said non-volatile persistent storage comprising a plurality of partitions of system data;

providing access to subsystems of a computer system by the CSSR, by way of a plurality of point-to-point connections to respective portions of said volatile run-time repository;

responsive to the CSSR being powered up, assigning unique portions of said volatile run-time repository corresponding to each of the plurality of partitions to each point-to-point connection of the plurality of point-to-point connections;

prioritizing access to each unique portion of said volatile run-time repository;

permitting access to each unique portion of said volatile run-time repository by way of only an assigned one of said point-to-point connections according to the prioritization;

updating at least one of the unique portions of said volatile run-time repository responsive to the permitting;

identifying the at least one unique portion of said volatile run-time repository that has been updated;

writing, via a background process, changes in said volatile run time repository to said non-volatile persistent storage in response to every update to the contents of said volatile run-time repository; and marking, in a flash update history register, responsive to the updating and identifying, that the at least one unique portion of said volatile run-time repository has been updated, the marking causing the change to be preserved after a power loss;

wherein a size of each of the plurality of partitions is configurable by reprogramming the CSSR.

13. The method according to claim 12, further comprising responsive to the CSSR beginning a power-down state, copying by the CSSR, content of said run-time repository into said non-volatile persistent storage.

14. The method according to claim 13, wherein the non-volatile persistent storage is NAND Flash memory.

15. The method according to claim 13, comprising providing accessibility of all of said unique portions of said non-volatile persistent storage by way of a z port; and
updating said unique portions of said non-volatile persistent storage when said subsystems of said computer system are stopped, through the z port.

16. The method according to claim 13, comprising providing accessibility to said non-volatile persistent storage via a pair of unique paths.

17. The method according to claim 13, further comprising arbitrating by a sequencer, access between each of said point-to-point connections, said arbitrating comprising any one of a first-come first-served basis or a predetermined priority scheme wherein each of said point-to-point connection has a predetermined access priority.

\* \* \* \* \*